United States Patent
Rugina et al.

(10) Patent No.: US 10,089,126 B2
(45) Date of Patent: Oct. 2, 2018

(54) FUNCTION EXIT INSTRUMENTATION FOR TAIL-CALL OPTIMIZED CODE

(71) Applicant: VMware, Inc., Palo Alto, CA (US)

(72) Inventors: Radu Rugina, Sunnyvale, CA (US); Ricardo E. Gonzalez, Portola Valley, CA (US); Zheng He, Beijing (CN); Alok Kataria, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 51 days.

(21) Appl. No.: 13/848,191

(22) Filed: Mar. 21, 2013

(65) Prior Publication Data
US 2014/0289726 A1    Sep. 25, 2014

(51) Int. Cl.
G06F 9/455 (2018.01)
G06F 9/48 (2006.01)
G06F 11/34 (2006.01)

(52) U.S. Cl.
CPC ...... *G06F 9/45525* (2013.01); *G06F 9/45545* (2013.01); *G06F 9/4812* (2013.01); *G06F 11/3466* (2013.01); *G06F 11/3409* (2013.01); *G06F 2201/815* (2013.01); *G06F 2201/865* (2013.01)

(58) Field of Classification Search
None
See application file for complete search history.

(56) References Cited

U.S. PATENT DOCUMENTS

| | | | |
|---|---|---|---|
| 5,590,332 A * | 12/1996 | Baker | 717/151 |
| 5,835,958 A * | 11/1998 | Long | G06F 9/4486 711/170 |
| 5,872,910 A | 2/1999 | Kuslak et al. | |
| 6,049,666 A * | 4/2000 | Bennett | G06F 11/323 714/E11.181 |
| 6,928,641 B1 * | 8/2005 | Szewerenko | G06F 8/70 717/159 |
| 6,961,927 B1 * | 11/2005 | Erb | G06F 11/3476 382/282 |
| 7,251,810 B1 * | 7/2007 | Nolte | G06F 11/3466 714/35 |
| 7,475,386 B1 * | 1/2009 | Shapiro | G06F 11/3644 717/128 |
| 7,735,067 B1 | 6/2010 | Leventhal | |
| 2004/0122834 A1 * | 6/2004 | Durrant | G06F 9/4425 |
| 2006/0168589 A1 * | 7/2006 | Moore | G06F 9/45537 719/315 |

(Continued)

OTHER PUBLICATIONS

Addbot, Tail call, Feb. 27, 2013, Wikipedia, pp. 12.*

(Continued)

*Primary Examiner* — Emerson Puente
*Assistant Examiner* — Zhi Chen
(74) *Attorney, Agent, or Firm* — Patterson & Sheridan, LLP

(57) ABSTRACT

Function exits are instrumented in tail-call optimized code in which calls to target functions and return instructions are replaced by jump instructions. A probe engine identifies a tail-call jump and instruments the jumps to raise an exception. In response to an exception raised at the tail-call jump, an exception handler loads various registers and transferring control to a trampoline, which calls the jump target. After the target function returns, an exit probe is fired when the trampoline itself returns.

18 Claims, 6 Drawing Sheets

(56) References Cited

U.S. PATENT DOCUMENTS

| | | | |
|---|---|---|---|
| 2006/0206880 A1* | 9/2006 | Barraclough et al. | 717/140 |
| 2007/0118763 A1* | 5/2007 | Kamei | G06F 21/125 |
| | | | 713/190 |
| 2007/0180439 A1 | 8/2007 | Sundararajan et al. | |
| 2008/0243969 A1 | 10/2008 | Wintergerst et al. | |
| 2008/0295095 A1 | 11/2008 | Watanabe et al. | |
| 2009/0037710 A1* | 2/2009 | Mavinakayanahalli | |
| | | | G06F 11/3644 |
| | | | 712/244 |
| 2009/0187884 A1* | 7/2009 | Kryka | G06F 8/54 |
| | | | 717/106 |
| 2010/0287541 A1 | 11/2010 | Saunders et al. | |
| 2011/0154297 A1* | 6/2011 | Singh et al. | 717/130 |
| 2011/0179162 A1 | 7/2011 | Mayo et al. | |
| 2011/0258616 A1* | 10/2011 | Sollich | G06F 9/44 |
| | | | 717/146 |
| 2011/0296110 A1 | 12/2011 | Lilly et al. | |
| 2012/0084778 A1 | 4/2012 | Mall et al. | |
| 2012/0159454 A1 | 6/2012 | Barham et al. | |
| 2012/0167057 A1 | 6/2012 | Schmich et al. | |
| 2012/0192283 A1* | 7/2012 | Gu | G06F 21/54 |
| | | | 726/26 |
| 2013/0104148 A1* | 4/2013 | Torgersen | G06F 9/4498 |
| | | | 719/320 |
| 2013/0219408 A1* | 8/2013 | Haruki | G06F 9/461 |
| | | | 718/108 |
| 2013/0326110 A1 | 12/2013 | Tsirkin et al. | |
| 2014/0115394 A1* | 4/2014 | Fattah | G06F 11/26 |
| | | | 714/32 |

OTHER PUBLICATIONS

Addbot, Trampoline, Mar. 12, 2013, Wikipedia, pp. 3.*
WillNess, Tail call, Aug. 24, 2011, Wikipedia, pp. 1-9.*
Clifford E. Cummings, Simulation and Synthesis techniques for Asynchronous FIFO Design, SNUG, San Jose, 2002.
Final Office Action dated Oct. 20, 2016 for Application No. 13848231.

* cited by examiner

FUNCTION EXIT INSTRUMENTATION FOR TAIL-CALL OPTIMIZED CODE

CROSS-REFERENCE TO RELATED APPLICATIONS

The present application is related to U.S. patent application Ser. No. 13/539,163 filed Jun. 29, 2012 and entitled "Simultaneous Probing of Multiple Software Modules of a Computer System" and U.S. patent application Ser. No. 13/593,463 filed Aug. 23, 2012 and entitled "Probing the Boot Sequence of a Computer System", both of which are assigned to the same assignee as the present application.

BACKGROUND

Various tools have been developed for monitoring performance of virtualized computer systems. One such tool, known as VProbes, which is developed by VMware, Inc. of Palo Alto, Calif., enables administrators to "dynamically" instrument various software modules of virtual machines (VMs) running in a virtualized computer system and gather performance data relating to the instrumented software modules for analysis. The tool provides for dynamic instrumentation because code for probing software modules can be injected while the VMs are running. As a result, answers to questions such as, "Why is an application running slowly in the virtual machine?" or "Which virtual machines are consuming the majority of the I/O bandwidth?" may be explored without recompilation or downtime. Further details of VProbes are described in a user's manual available from VMware, Inc. entitled "VMware VProbes User Guide," which is incorporated by reference herein.

A probe script is employed in VProbes as a mechanism to dynamically inject code for probing software modules of VMs. The probe script defines one or more probes, each probe having a trigger and a body of code. The trigger specifies an event of interest in the instrumented software module, such as a function entry or exit point, or a periodic timer tick, and the body of code is executed when the event of interest occurs, i.e., when the probe is triggered. When such a probe script is loaded into a virtualized computer system with running VMs, it is compiled into executable code that is dynamically injected into various executing portions of the virtualized computer system. For security purposes, the probe script is checked at runtime for infinite loops, bad pointers, and generally any portions that could cause the system to hang or crash.

VProbes, as described above, is safe, because it ensures through the script compiler that the state of the running virtualized computer system does not change. VProbes is also dynamic, because probes can be injected into a running virtualized computer system without recompilation and downtime of the virtualized computer system. Finally, VProbes has little or no impact on overhead, because it can be unloaded and not add to the overhead of the virtualized computer system when not in use.

SUMMARY

One or more embodiments disclosed herein provide a probing tool for virtualized computer systems that extends the benefits of VProbes. According to the embodiments, function exits may be instrumented, even in the presence of tail-call optimizations, by dynamically undoing the tail-call optimizations and converting them back into regular calls followed by returns. Embodiments disclosed herein identify tail-call jumps in tail-call optimized code and instrument those jumps to raise an exception. In response to such an exception, an exception handler may transfer control to a trampoline which calls the jump target, and the return from the trampoline itself may raise a further exception which is handled by firing the exit probe.

A method for probing function exits in tail-call optimized code includes identifying, by a probe engine executing one or more portions of a probe script, a tail-call jump to a target function, and instrumenting the tail-call jump to trap to a handler. When an exception traps to the handler in response to the tail-call jump, the handler transfers control to a trampoline which calls the target function. The return of the trampoline itself traps to a handler which fires an exit probe.

Further embodiments of the present invention include, without limitation, a non-transitory computer-readable storage medium that includes instructions that enable a computer system to implement one or more aspects of the above methods as well as a computer system configured to implement one or more aspects of the above methods.

DETAILED DESCRIPTION

Figure 1A:
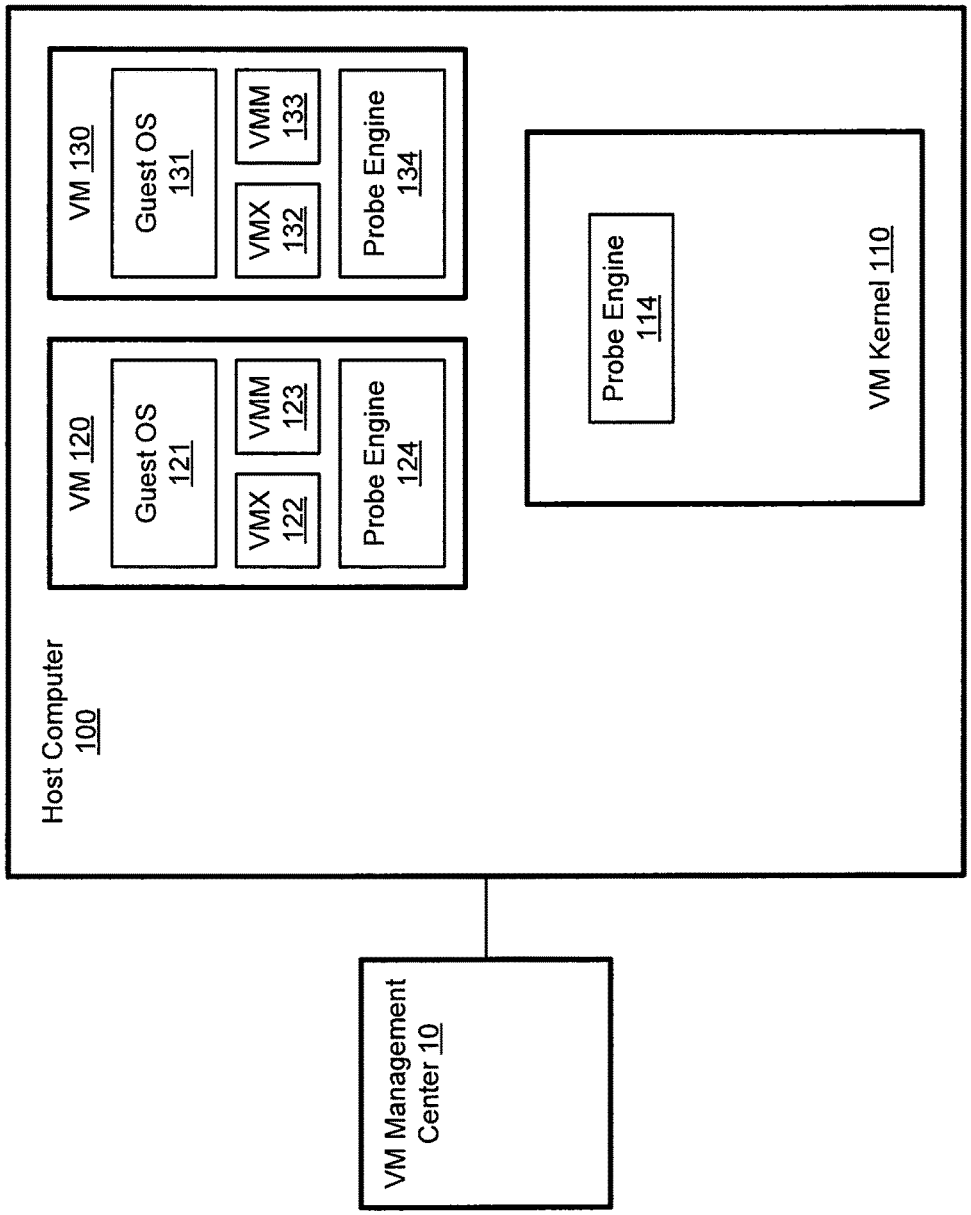
FIG. 1A is a block diagram of a computer system in which probing according to one or more embodiments may be implemented.

FIG. 1A is a block diagram of a computer system in which probing according to one or more embodiments may be implemented. The computer system, as illustrated, includes a virtual machine management center 10 for managing virtual resources, such as virtual machines (VMs) and a host computer 100 in which VMs 120, 130 are running. For purposes of illustration, two VMs are shown in FIG. 1A but it should be recognized that embodiments may be practiced with just a single VM or with more than two VMs.

VM 120 includes a guest operating system (OS) 121 that provides system software support for applications running inside VM 120, and several processes, including VMX 122 and a virtual machine monitor (VMM) 123, that run inside VM kernel (VMK) 110, which represents the kernel of system software of host computer 100. VMX 122 is a process that is responsible for handling input/output (I/O) to devices that are not critical to performance, and for communicating with user interfaces and virtual machine management center 10. It should be understood that a VMX process associated with a VM is different from a .vmx file for that VM, which stores configuration settings for that VM including configurations settings associated with VProbes, as described in the VMware VProbes User Guide. VMM 123 is responsible for virtualizing the guest OS instructions, and manages memory for the VM 120. VMM 123 also passes storage and network I/O requests to VMK 110, and all other requests to VMX 122. Similarly, VM 130 includes a guest OS 131, VMX 132, and VMM 133.

Probing in the computer system of FIG. 1A is implemented via a probe engine configured in each of VMs and VMK 110. As shown, probe engines 124, 134 are configured for VMs 120, 130, respectively, and probe engine 114 is configured for VMK 110. Each of the probe engines operates independently, except that some variables are shared among the probe engines in a manner that will be described below. Within each VM, probing may be separately enabled for (1) the guest, which includes the guest OS and the applications running on top of the guest OS, (2) the VMX, and (3) the VMM. The different targets of probing, which include the guest, the VMX, the VMM, and the VM kernel will be referred to hereinafter as the GUEST domain, the VMX domain, the VMM domain, and the VMK domain, respectively. It should be recognized that all vCPU threads are part of the VMM domain, and pCPU (physical central processing unit) threads are part of the VMK domain. As described herein, each of the probed domains, the guest, the VMX, the VMM, and the VM kernel, is a software module that runs as separate processes in the computer system.

Figure 1B:
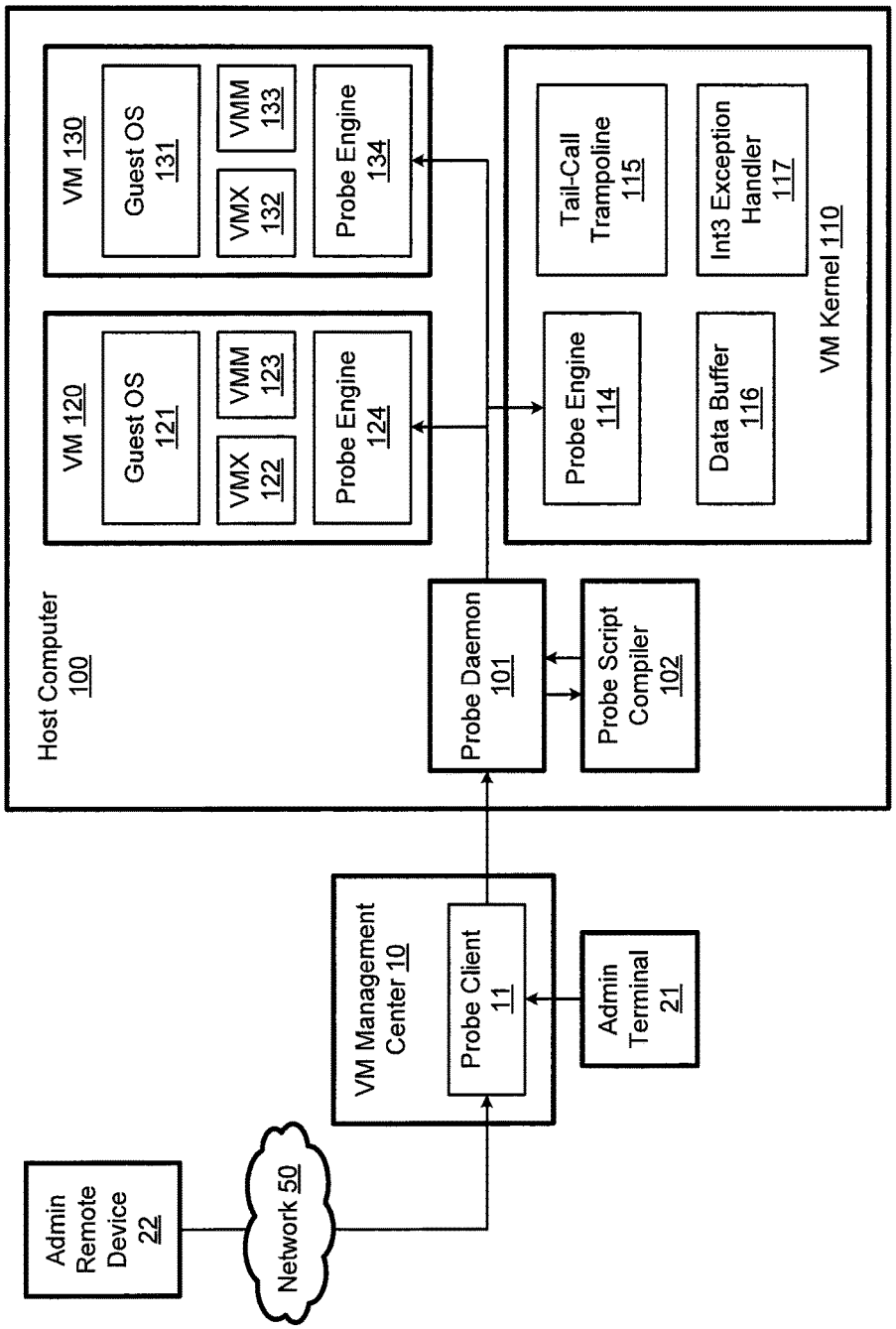
FIG. 1B illustrates a process of deploying probes in the computer system of FIG. 1A, according to an embodiment.

FIG. 1B illustrates a process of deploying probes in the computer system of FIG. 1A. In the embodiment illustrated herein, probes are deployed when a user loads a probe script into the computer system through a probe client 11 running in VM management center 10. The user may load the probe script using an administrator terminal 21 that interfaces with probe client 11 or remotely via network 50 from an administrator's remote device 22, which may be any type of computing device, such as a smartphone, a tablet computing device, laptop computer, and a desktop computer.

Once a probe script is loaded via probe client 11, the probe script is transmitted to and received by a probe daemon 101 running in host computer 100. Probe daemon 101 is responsible for coordinating the initial compilation of the probe script and extracting components for final compilation by each of probe engines 114, 124, 134. In one embodiment, probe script compiler 102 performs the initial compilation to generate a byte code for each of the different probes defined in the probe script. During this initial compilation, probe script compiler 102 inserts run-time checks for infinite loops, bad pointers, and generally any portions that could cause the system to hang or crash. In one embodiment, the Emmett compiler described in the "VMware VProbes User Guide" may be used as probe script compiler 102.

Each of probe engines 114, 124, 134 is responsible for compiling the byte code for one or more probes received from probe daemon 101 into binary code and injecting the binary code for the probes into the targeted domain. When a probe executes in a particular domain, it has access to information specific to that domain. For example, a probe that executes in the VMM domain may have access to VMM specific information, such as the register contents of the vCPUs, whereas a probe that executes in the VMK domain may have access to register contents of the pCPUs and other VM kernel data structures. As part of the binary code compilation process, each of probe engines 114, 124, 134 provisions a queue in system memory for each vCPU or pCPU thread being probed. When a probe executes within a particular vCPU or pCPU thread, the output generated by the probe is collected into the queue provisioned for this thread. Probe engine 114 for the VMK domain also provisions a data buffer 116, into which the outputs stored in each of the queues are collected (e.g., periodically). The collected output may then be provided to probe client 11 and ultimately displayed to a user in any feasible form (e.g., print statements, a histogram, etc.).

The probe script includes one or more probes, where each probe defines a domain that it is targeting, a trigger, and a body of code. The targeted domain may be any of GUEST, VMX, VMM, and VMK. In situations where there are multiple instances of the same domain, e.g., where there are two VMs, the targeted domains will be GUEST1, GUEST2, VMX1, VMX2, VMM1, VMM2, and VMK. The trigger specifies an event of interest in the targeted domain, such as a function exit, and the body of code is executed when the event of interest occurs. Various data types may be defined for the output generated by the probes, such as strings, aggregates, and bags, all of which are further described in the "VMware VProbes User Guide."

Figure 2:
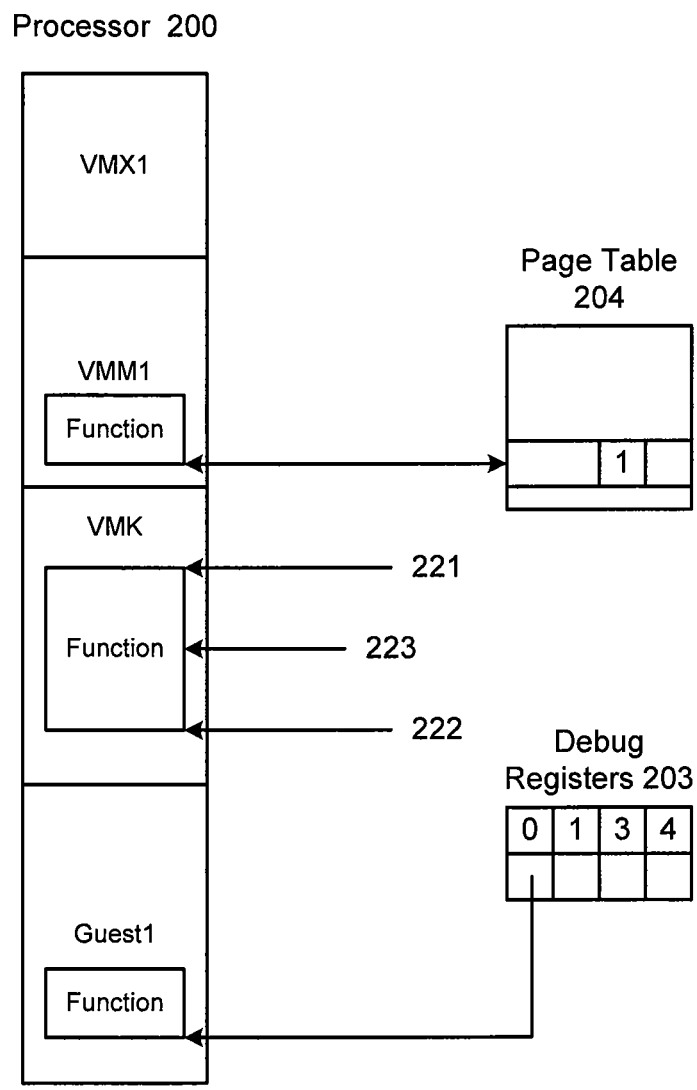
FIG. 2 is a conceptual diagram that illustrates dynamic probing of a sequence of instructions, according to an embodiment.

FIG. 2 is a conceptual diagram that illustrates dynamic probing of a sequence of instructions, according to an embodiment. In general, there are three classes of probes—static probes, dynamic probes, and periodic probes. Dynamic probes in particular are probes that trigger at breakpoints on arbitrary instructions or watchpoints on an arbitrary piece of data. In the example shown in FIG. 2, processor 200 is executing a sequence of instructions, including code for the VMX domain, the VMM domain, the VMK domain, and the Guest domain. A probe may also be injected at various points in the sequence of instructions that may be dynamically defined by causing an exception and executing the probe as part of the exception handling routine.

FIG. 2 illustrates three such examples in which an int3 instruction is inserted at the beginning of a function (point 221), at the end of a function (point 222), or at a certain byte offset from the beginning of a function (point 223). When the int3 instruction is reached, an exception is raised and a probe is executed in response thereto. However, return addresses may be optimized out by compiler tail-call optimization. Tail-call optimization is an optimization that compilers perform to decrease the size of runtime stacks and reduce call-return runtime overhead. The optimization is applicable where a function ends with a call to another function or a recursive call to itself. In such cases, the compiler may optimize the function's instructions by removing the function's stack frame via a "leave" instruction, and replacing the call to the jump target and the return instruction with a jump instruction, as illustrated below with respect to FIG. 3A.

Because the return instruction is eliminated during tail-call optimization, function exits (point 222) cannot be instrumented by simply trapping their returns. As a result, embodiments disclosed herein identify tail-call jumps in tail-call optimized code and instrument those jumps to raise an exception (e.g., an int3 debug breakpoint exception). In response to such an exception, an exception handler (e.g., int3 exception handler 117) may transfer control to a trampoline 115 which calls the jump target, and the return of trampoline 115 itself may raise a further exception which is handled by firing the exit probe. Illustratively, trampoline 115 is in VM kernel 110 which, as discussed in greater detail below, ensures that trampoline 115 is not removed when the probe script is unloaded. As a result, trampoline 115 is always available to functions called from instrumented tail-calls, thereby permitting those functions to execute successfully even if the code itself is uninstrumented.

In a particular embodiment, discussed in greater detail below, a probe engine (e.g., probe engines 114, 124, 134) executing one or more portions of a probe script may use a decoder to scan the binary code of functions and identify jump instructions therein. The probe engine may instrument each jump instruction which corresponds to a tail-call jump by patching the jump instruction's address with a debug breakpoint int3 instruction. At runtime, int3 exception handler 117 may handle an exception corresponding to a tail-call jump by loading the jump target address and an exit probe ID into respective registers, then transferring control to trampoline 115, which calls the jump target indirectly via the register that stores the jump target's address. Then, in response to an exception raised at trampoline's 115 return, int3 exception handler 117 (on another exception handler) may fire an exit probe having the ID stored in the probe ID register.

Although discussed above with respect to int3 instructions, other techniques for causing exceptions may be used. Illustratively, instruction addresses (e.g., addresses of tail-call jumps) may be stored in debug registers 203. When those instruction addresses are reached, an exception may be raised. As another example, attributes of an entry of a page table 204 may be changed to cause an exception when an instruction (e.g., a tail-call jump) accesses that page table.

Figure 3A:
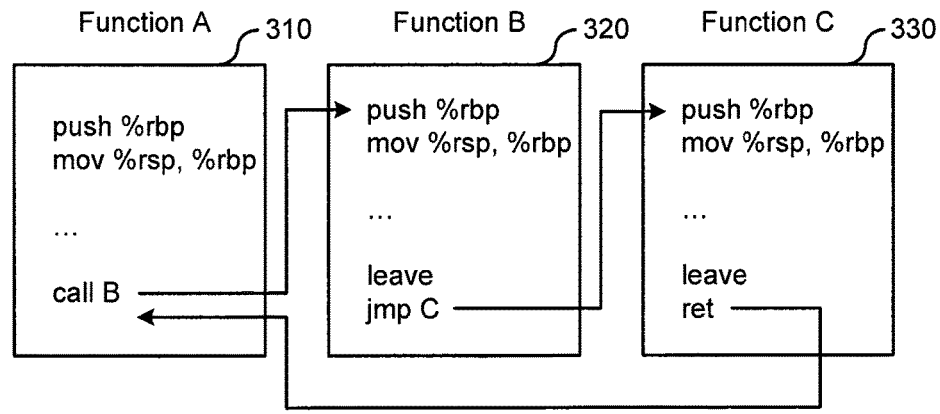
FIG. 3A is a conceptual diagram that illustrates a tail-call optimization, according to an embodiment.

FIG. 3A is a conceptual diagram that illustrates a tail-call optimization, according to an embodiment. As shown, FIG. 3A depicts a first function 310 ("Function A") which calls a second function 320 ("Function B") which, in turn, calls a third function 330 ("Function C"). As shown, each function 310-330 begins with a standard prologue for setting up the stack frame of the function. The function prologue includes "push % rpb" and "mov % rsp, % rpb," where % rpb is the base pointer and % rsp is the stack pointer. Illustratively, Function B's call to Function C occurs at the end of Function B, and a compiler has optimized the standard "call C," "leave," and "ret" instructions such that Function B's stack frame is removed via the "leave" instruction, and by replacing the "call C" and "ret" instructions with a jump instruction "jmp C."

Popping Function B's frame leaves the return address of A at the top of the stack when Function C executes. Thus, when Function C returns, it transfers control directly to Function A, without going through Function B. Doing so eliminates one return instruction and reduces stack usage. In FIG. 3A's example, at most two stack frames are present on the stack after tail-call optimization, whereas three frames would be present without the optimization. The effects of such optimization may be amplified where tail calls are "chained" to each other, i.e., if a tail call is to a function which also makes a tail call, or if the tail call is a recursive call. In the latter case, tail-call optimization essentially converts recursion into a loop.

In general, functions may have multiple return paths, some that end with tail calls, and others that end with return instructions. For functions having at least one tail-call optimized return path, exit instrumentation cannot be implemented by trapping the functions' return, as such returns may be optimized out. For example, Function C returns directly to Function A, bypassing Function B and, as a result, Function B's exit cannot be instrumented by trapping its return. At the same time, trapping Function B's call to Function C would be too early, as Function B returns only after Function C returns. Further, instrumenting the return instruction of Function C does not help, as Function C may be called from places other than the end of Function B.

Figure 3B:
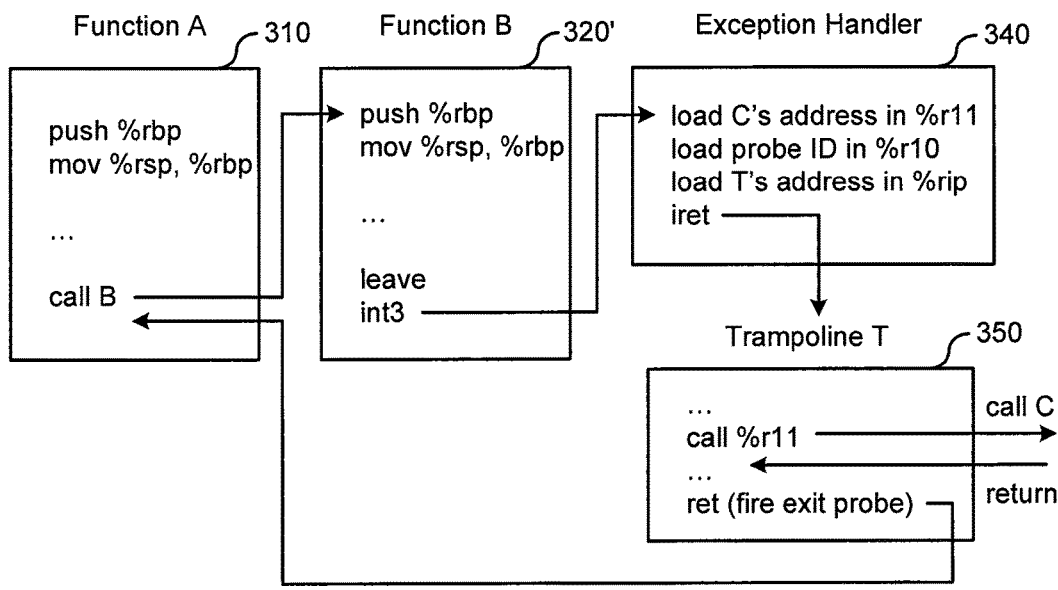
FIG. 3B is a conceptual diagram that illustrates tail-call instrumentation using a trampoline, according to an embodiment.

FIG. 3B is a conceptual diagram that illustrates tail-call instrumentation using a trampoline, according to an embodiment. As shown, Function B is modified to replace the jump instruction "jmp C" with an int3 instruction, which sets a breakpoint that traps to an exception handler 340. In one embodiment, a probe engine executing one or more portions of a probe script may dynamically identify tail-call jumps and patch the address of the jump instruction with the int3 instruction. When int3 exceptions trap to exception handler 340, exception handler 340 may check whether the exception is due to a tail-call jump. If such is the case, exception handler 340 may load the jump target's address and the ID of an exit probe into respective registers, and further load a trampoline's 350 ("Trampoline T") address into the instruction pointer. Then, after exception handler 340 performs an interrupt return iret instruction, control may be transferred to trampoline 350.

Illustratively, a generic trampoline 350 may be used which supports each function exit probe in the probe script. In one embodiment, the trampoline 350 may call the jump target indirectly via a register. As discussed, exception handler 350 may load the jump target's address into a predefined register. Illustratively, exception handler 340 loads Function C's address in register r11. Trampoline 350 then calls Function C indirectly via register r11. After Function C returns, trampoline 350 may itself return. As shown, trampoline 350's return traps to an exit probe. Any feasible exit probe may be used (e.g., an exit probe that causes the return value to be displayed to a user). In general, a probe script may include multiple exit probes. In order to indicate which exit probe to fire at trampoline 350's return, exception handler 340 may load a probe ID in a predefined register before transferring control to trampoline 350. As shown, register r10 is used to store probe IDs. Note, this register must be preserved across the call. Since the register is a caller-saved register, the register may be saved/restored on the stack.

Figure 4:
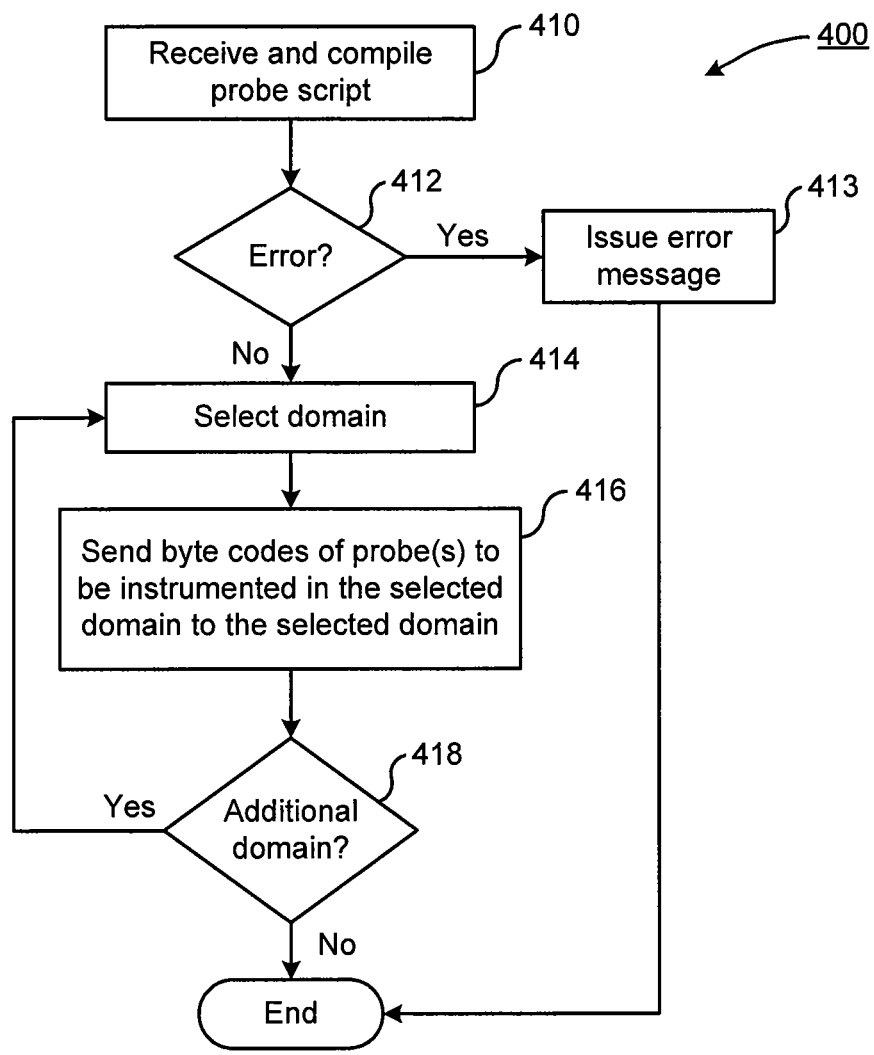
FIG. 4 is a flow diagram that illustrates a method for deploying probes in different software modules of the computer system, according to an embodiment.

FIG. 4 is a flow diagram that illustrates a method 400 for deploying probes in different software modules of the computer system. In the embodiment illustrated herein, this method 400 is being carried out by probe daemon 101 in conjunction with probe script compiler 102. The method 400 begins at step 410 when a probe script loaded into probe client 11 and received by probe daemon 101. In response, probe daemon 101 invokes probe script compiler 102 to compile the probe script into byte codes and insert run-time checks for infinite loops, bad pointers, and generally any portions that could cause the system to hang or crash. If it is determined at step 412 that the probe script has errors, an appropriate error message is issued to probe client 11. If there are no errors, probe daemon 101 segments the byte codes for distribution. At step 414, probe daemon 101 selects a domain as a distribution target. Then, at step 416, probe daemon 101 sends the byte code of the probe or probes to be instrumented in the selected domain to a probe engine of the selected domain (step 416). Upon receipt of the byte code, the probe engine compiles the byte code into binary code and executes the binary code, during which the probe engine may dynamically inject probes at appropriate locations. In some embodiments, the probes may include function exit probes, and the probing of function exits may be implemented according to method 500, discussed below. If there are more domains to process, as determined at step 418, the method 400 returns to step 414. If not, the method 400 terminates.

Figure 5:
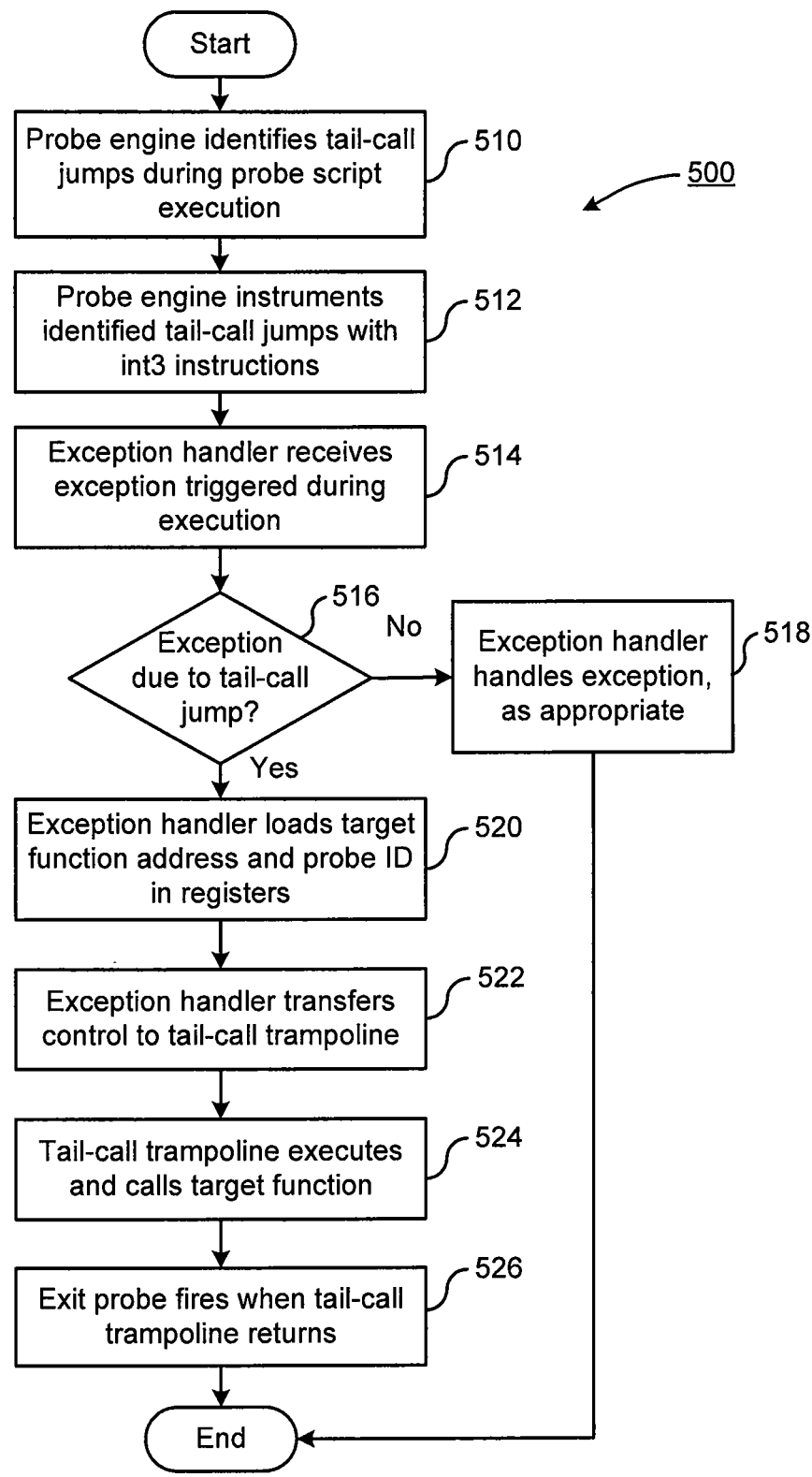
FIG. 5 is a flow diagram that illustrates a method for instrumenting function exits in tail-call optimized code, according to an embodiment.

FIG. 5 is a flow diagram that illustrates a method 500 for instrumenting function exits in tail-call optimized code, according to an embodiment. As shown, the method 500 begins at step 510, where a probe engine (e.g., probe engine 114, 124, or 134) executing one or more portions of a probe script identifies tail-call jumps. In order to distinguish tail-call jumps from intra-procedural jumps, the probe engine may check (e.g., using a symbol table) that the target is the address of a known function symbol. In one embodiment, the probe engine may use a decoder to scan the binary code of functions to be executed to identify jump instructions. In a further embodiment, the probe engine may guarantee correct identification of instruction boundaries by sequentially decoding instructions to record instruction boundaries and jump targets, then checking that all jump targets match instruction boundaries. If the function includes indirect jumps, including indirect tail-call jumps, or if the target of direct jumps do not match instruction boundaries, then the function may be deemed uninstrumentable for exit. Doing so ensures that instrumentation is not performed on the wrong instruction or in the middle of an instruction, both of which may cause runtime crashes.

At step 512, the probe engine instruments identified tail-call jumps with int3 instructions. Once the probe engine has identified an address of a tail-call jump, or multiple such addresses where a function has multiple tail-call return paths, the probe engine may perform instrumentation by patching each resolved address with a debug breakpoint int3 instruction, which causes a trap to an int3 exception handler. In one embodiment, the patched int3 instruction may later be removed when the probe script being executed by the probe engine is unloaded, thereby uninstrumenting the code and returning the code to its original, optimized form. Note, although described with respect to int3 debug instructions, alternative embodiments may employ other techniques for trapping to an exception handler, such as those discussed above with respect to FIG. 2.

At step 514, int3 exception handler 117 receives an int3 exception triggered during execution of the function. At step 516, exception handler 117 determines if the exception was due to a tail-call jump. In one embodiment, the probe engine may register addresses of tail-call jumps identified at step 510, and exception handler 117 may check whether the interrupt address is one such registered address. If exception handler 117 determines that received int3 exception was not due to a tail-call jump, then, at step 518, exception handler 117 handles the exception in any appropriate manner.

If, however, exception handler 117 determines that the received int3 exception was due to a tail-call jump, then at step 520, exception handler 117 loads an address of a jump target and a probe ID into respective registers, loads an address of trampoline 115 into an instruction pointer, and calls tail-call trampoline 115. As discussed, trampoline 115 may call the target function indirectly via the register which stores the target function's address. In addition, the stored probe ID may indicate which exit probe to fire when trampoline 115 returns.

At step 522, exception handler 117 transfers control to tail-call trampoline 115. For example, control may be transferred after exception handler 117 performs an interrupt return iret instruction, which may itself occur after exception handler 117 loads the address of trampoline 115 into an instruction pointer.

At step 524, tail-call trampoline 115 executes and calls the target function. In one embodiment, code of trampoline 115 may include the following instructions:

| | |
|---|---|
| push %rbp | prologue to set up new frame |
| mov %rsp, %rbp | |
| push %r10 | save probeID |
| . . . | duplicate prior frame |
| call %r11 | call target function |
| pop %r10 | restore probeID |
| leave | pop current frame |
| ret | trap, fire exit probe |

In this case, tail-call trampoline 115 adds an extra frame to the stack and calls the target function indirectly via register r11, which stores the target function's address. In addition, in situations where the current frame is not the first frame on the stack, trampoline 115 duplicates the prior frame before calling the target function. Doing so ensures that the target function is able to find data on the runtime stack at expected places, which may otherwise be impeded by the addition of the trampoline frame. For example, if the prior frame were not duplicated, the target function may be unable to find input arguments, as the addition of the trampoline frame may cause those arguments to appear at different places on the stack than the target function expects. Of course, duplication of the prior frame may be omitted in some cases. For example, such duplication may be unnecessary where arguments are passed via registers.

In one embodiment, trampoline 115 may be placed in a kernel core (e.g., a VM kernel). As discussed, debug breakpoint instructions may be removed by a probe engine when a probe is unloaded, thereby un-doing instrumentation of the code. In such a case, functions that will eventually return to trampoline 115 may still be running. Placing trampoline 115 in the kernel core ensures that trampoline 116 is never unloaded so that trampoline 115 is always available to functions called from instrumented tail-calls, thereby permitting those functions to be able to complete execution successfully.

At step 526, an exit probe fires when trampoline 115 returns. In one embodiment, the probe engine may add a debug breakpoint int3 instruction at trampoline's 115 return that traps to int3 exception handler 117 (or another exception handler). Int3 exception handler 117 may then fire the exit probe. An ID of the particular exit probe to fire may be loaded in a register which is used to indicate the particular exit probe to fire, and the exception handler may indirectly reference the exit probe via the register. When a probe actually fires, output generated by the probe may be collected into a queue provisioned for the vCPU or pCPU thread in which the probe executes. Here, outputs stored in different queues may be collected (e.g., periodically) into a kernel data buffer. The collected output may then be provided to a probe client and ultimately displayed to a user in any feasible form (e.g., print statements, a histogram, etc.).

Advantageously, embodiments disclosed herein permit function exit instrumentation of tail-call optimized code. Tail call optimization is a common optimization technique that compilers perform. As a result, many functions, which may otherwise be uninstrumentable for exit, can be instrumented according to techniques disclosed herein. In turn, function exit instrumentation may permit the collection of event traces, histograms, and other data for purposes of debugging, monitoring, and understanding system behavior.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method for probing function exits in tail-call optimized code, comprising:
    identifying, by a probe engine in a virtualized computer system, a jump instruction in the tail-call optimized code, wherein the jump instruction corresponds to a tail-call jump to a first function from a second function, and wherein, if the jump instruction were to be executed, then a return instruction in the first function would cause a return from the first function to a third function which calls the second function;
    instrumenting, by the probe engine, the identified jump instruction, wherein the instrumenting includes injecting code which raises a first exception that traps to a handler; and
    after the first exception traps to the handler, transferring, by the handler, control to a trampoline which includes a call instruction that makes a call to the first function, wherein the trampoline adds a trampoline frame to a runtime stack and, in response to determining the added trampoline frame is not a first frame on the runtime stack, duplicates a frame prior to the trampoline frame before calling the first function,
    wherein a return of the trampoline to the third function, after the first function returns to the trampoline, raises a second exception handled by firing an exit probe to collect data in response to the return of the trampoline.

2. The method of claim 1, wherein instrumenting the jump instruction includes patching an address of the jump instruction with a debug breakpoint instruction.

3. The method of claim 1, wherein the handler loads an address of the first function into a first register, and wherein the trampoline calls the first function indirectly via the first register.

4. The method of claim 3, wherein the handler loads an ID of the exit probe into a second register, and wherein the exit probe having the ID stored in the second register is fired.

5. The method of claim 1, wherein the trampoline is in a kernel core.

6. The method of claim 1, further comprising, uninstrumenting the jump instruction upon an unloading of a probe script.

7. The method of claim 1, wherein the identifying of the jump instruction includes scanning binary code to determine jump instructions and checking whether targets of the jump instructions are addresses of known function symbols.

8. The method of claim 1, wherein the first, second, and third functions are associated with at least one of a hypervisor, a virtual machine running on the hypervisor, and a guest operating system running on the virtual machine.

9. The method of claim 1, wherein the data collected includes a value returned by the trampoline.

10. A non-transitory computer readable storage medium comprising instructions, wherein the instructions, when executed in a computer system, cause the computer system to perform a method for probing function exits in tail-call optimized code that includes the steps of:

identifying, by a probe engine in a virtualized computer system, a jump instruction in the tail-call optimized code, wherein the jump instruction corresponds to a tail-call jump to a first function from a second function, and wherein, if the jump instruction were to be executed, then a return instruction in the first function would cause a return from the first function to a third function which calls the second function;

instrumenting, by the probe engine, the identified jump instruction, wherein the instrumenting includes injecting code which raises a first exception that traps to a handler; and after the first exception traps to the handler, transferring, by the handler, control to a trampoline which includes a call instruction that makes a call to the first function, wherein the trampoline adds a trampoline frame to a runtime stack and, in response to determining the added trampoline frame is not a first frame on the runtime stack, duplicates a frame prior to the trampoline frame before calling the first function, wherein a return of the trampoline to the third function, after the first function returns to the trampoline, raises a second exception handled by firing an exit probe to collect data in response to the return of the trampoline.

11. The non-transitory computer readable storage medium of claim 10, wherein instrumenting the jump instruction includes patching an address of the jump instruction with a debug breakpoint instruction.

12. The non-transitory computer readable storage medium of claim 10, wherein the handler loads an address of the first function into a first register, and wherein the trampoline calls the first function indirectly via the first register.

13. The non-transitory computer readable storage medium of claim 12, wherein the handler loads an ID of the exit probe into a second register, and wherein the exit probe having the ID stored in the second register is fired.

14. The non-transitory computer readable storage medium of claim 10, wherein the trampoline is in a kernel core.

15. The non-transitory computer readable storage medium of claim 10, the steps further comprising, uninstrumenting the jump instruction upon an unloading of a probe script.

16. The non-transitory computer readable storage medium of claim 10, wherein the identifying of the jump instruction includes scanning binary code to determine jump instructions and checking whether targets of the jump instructions are addresses of known function symbols.

17. The non-transitory computer readable storage medium of claim 10, wherein the first, second, and third functions are associated with at least one of a hypervisor, a virtual machine running on the hypervisor, and a guest operating system running on the virtual machine.

18. A system, comprising:

a processor; and a memory, wherein the memory includes a program for probing function exits in tail-call optimized code, the program being configured to perform operations comprising:

identifying, by a probe engine in a virtualized computer system, a jump instruction in the tail-call optimized code, wherein the jump instruction corresponds to a tail-call jump to a first function from a second function, and wherein, if the jump instruction were to be executed, then a return instruction in the first function would cause a return from the first function to a third function which calls the second function, instrumenting, by the probe engine, the identified jump instruction, wherein the instrumenting includes injecting code which raises a first exception that traps to a handler, and after the first exception traps to the handler, transferring, by the handler, control to a trampoline which includes a call instruction that makes a call to the first function, wherein the trampoline adds a trampoline frame to a runtime stack and, in response to determining the added trampoline frame is not a first frame on the runtime stack, duplicates a frame prior to the trampoline frame before calling the first function, wherein a return of the trampoline to the third function, after the first function returns to the trampoline, raises a second exception handled by firing an exit probe to collect data in response to the return of the trampoline.

* * * * *